March 25, 1969 E. R. KOLB ET AL 3,435,309
CORONA CHARGING UNIT
Original Filed Nov. 27, 1962 Sheet 1 of 10

INVENTORS
EDWIN R. KOLB,
JAMES I. RICHARDSON &
BY FRANCIS HUNSTIGER

Marchal, Biebel, French & Bugg
ATTORNEYS

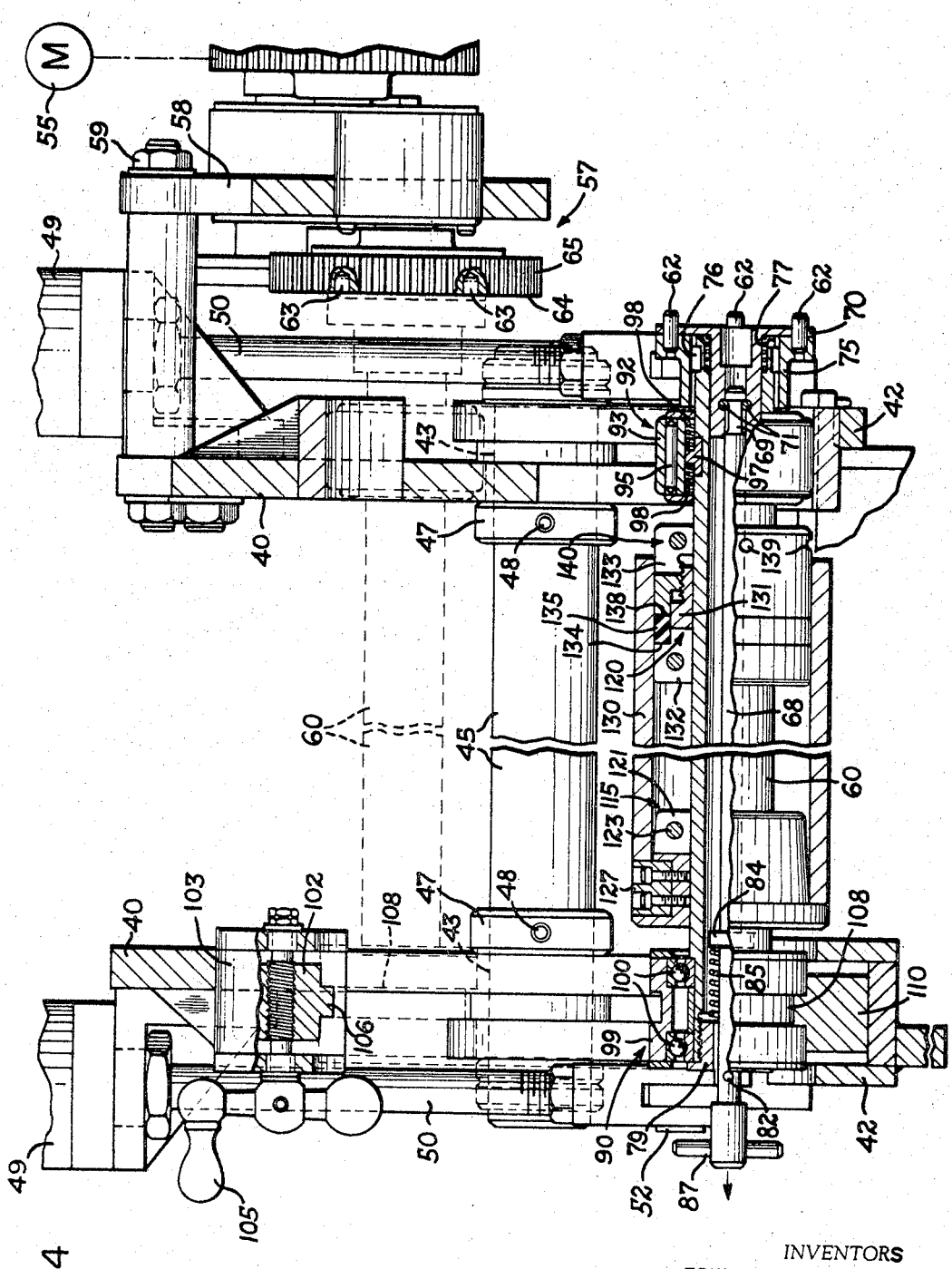

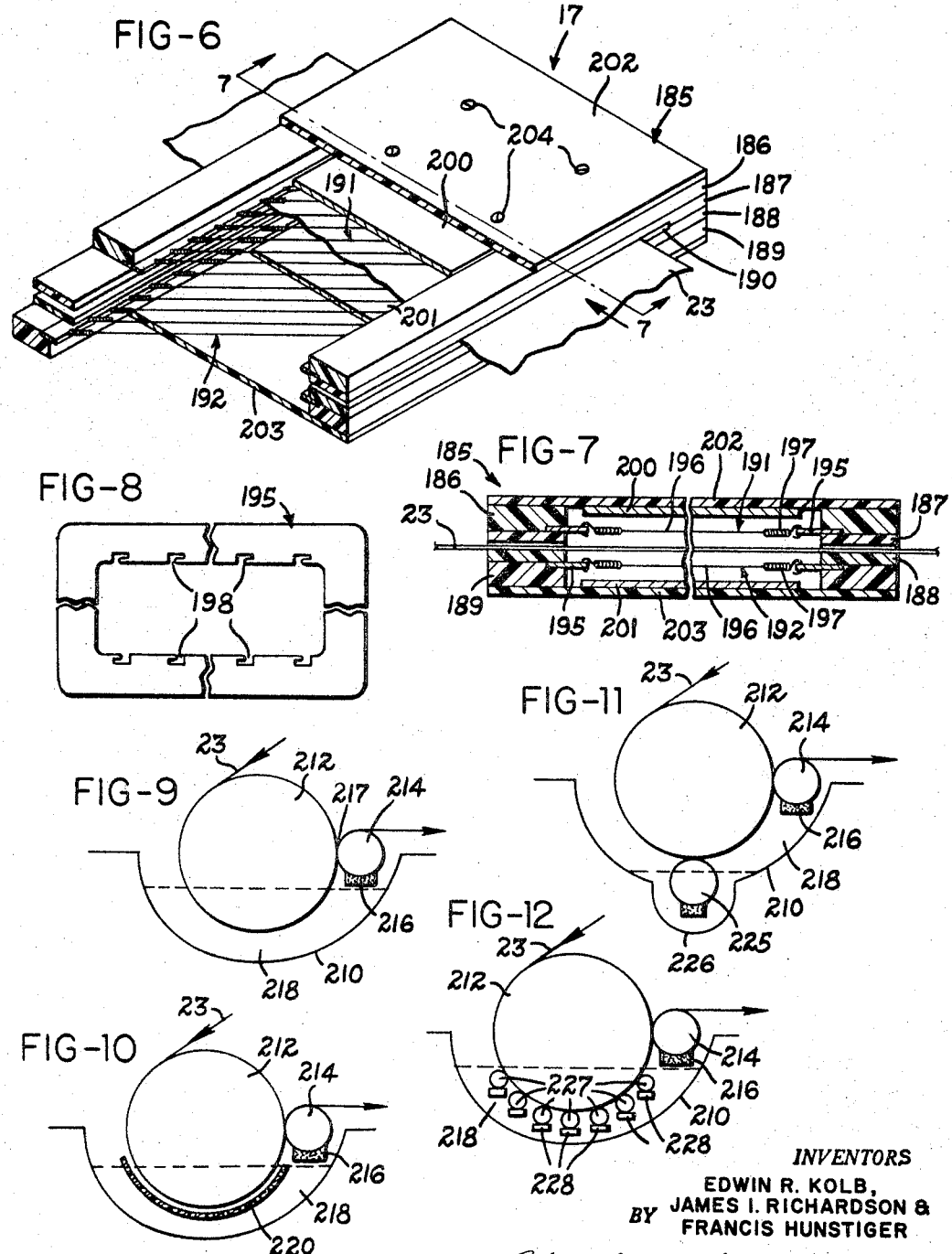

INVENTORS
EDWIN R. KOLB,
JAMES I. RICHARDSON &
FRANCIS HUNSTIGER

BY Marechal, Biebel, French & Bugg
ATTORNEYS

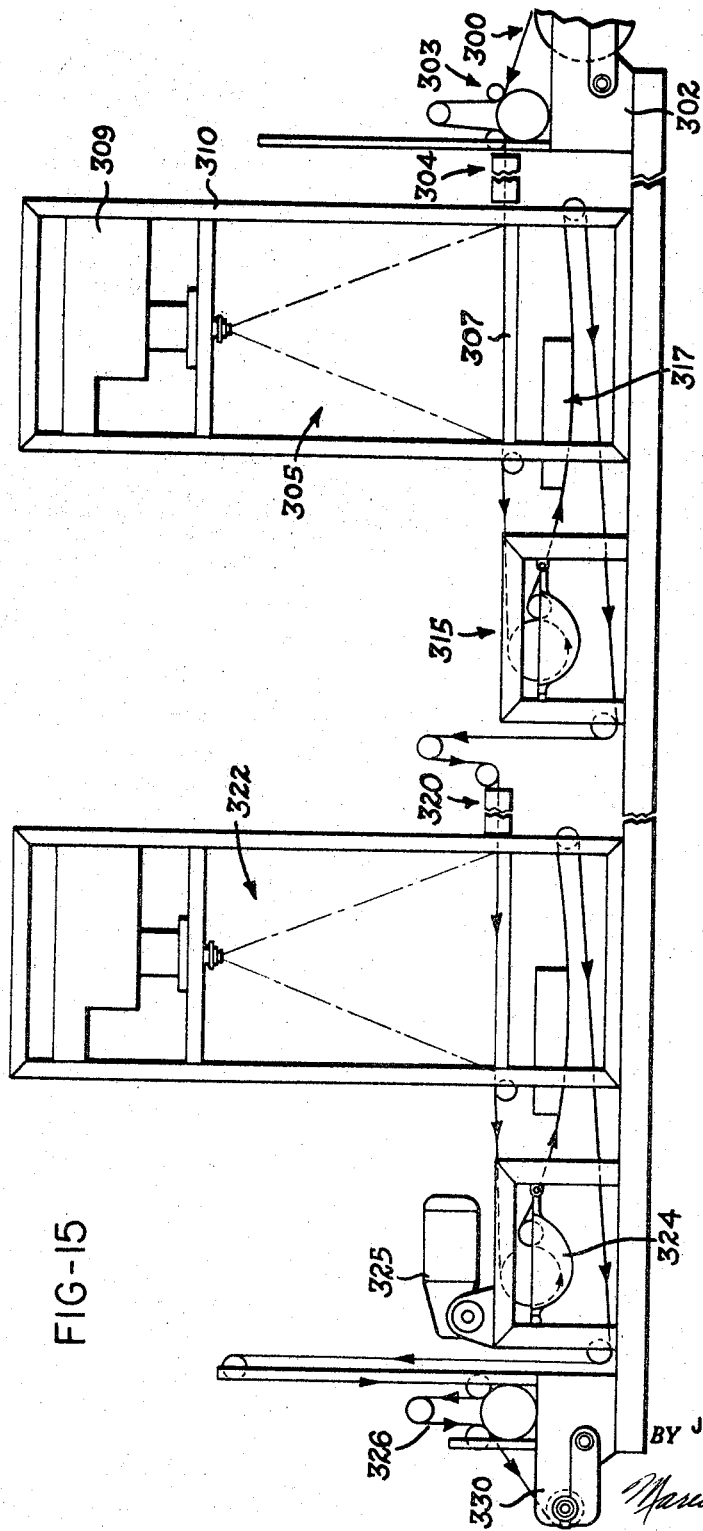

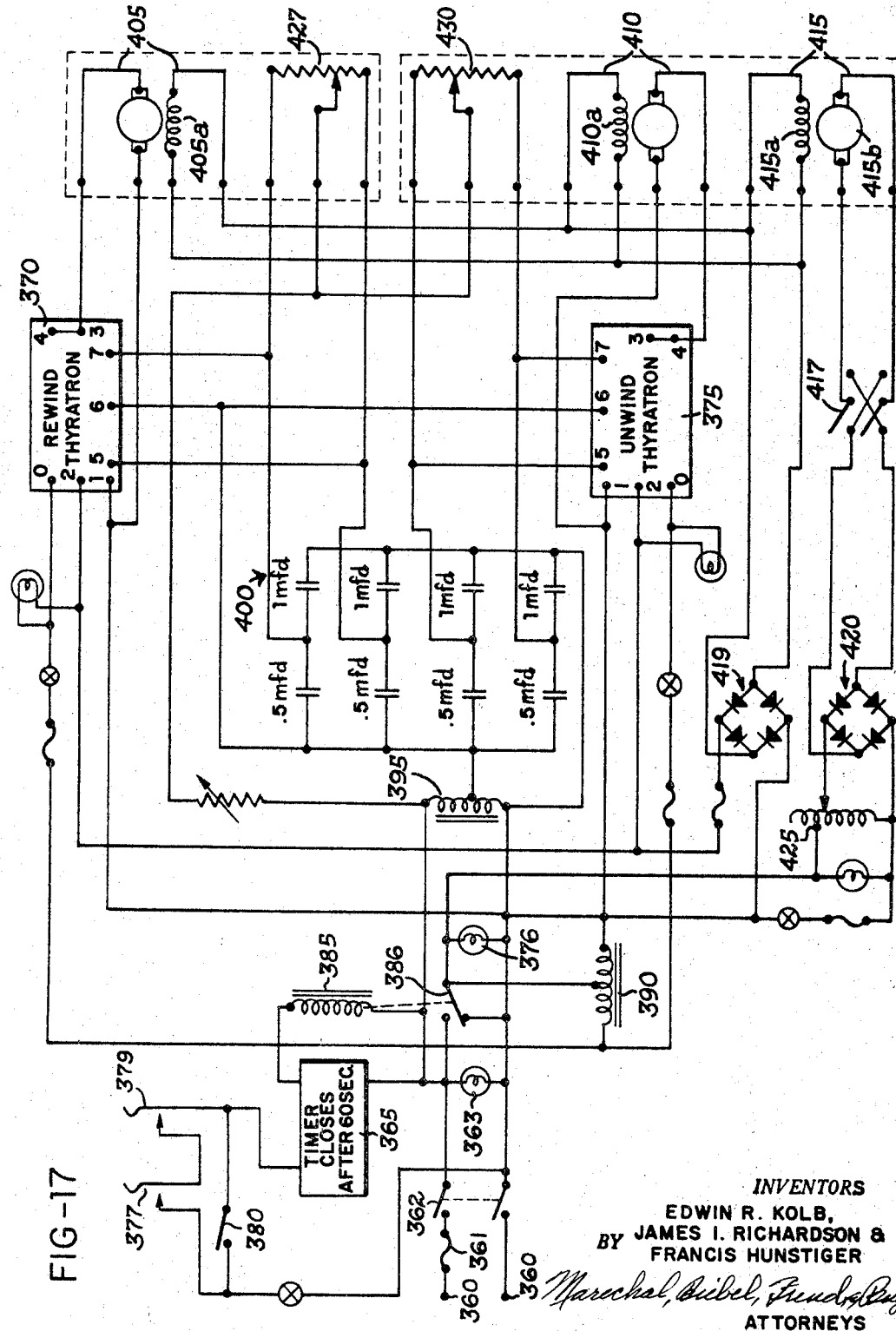

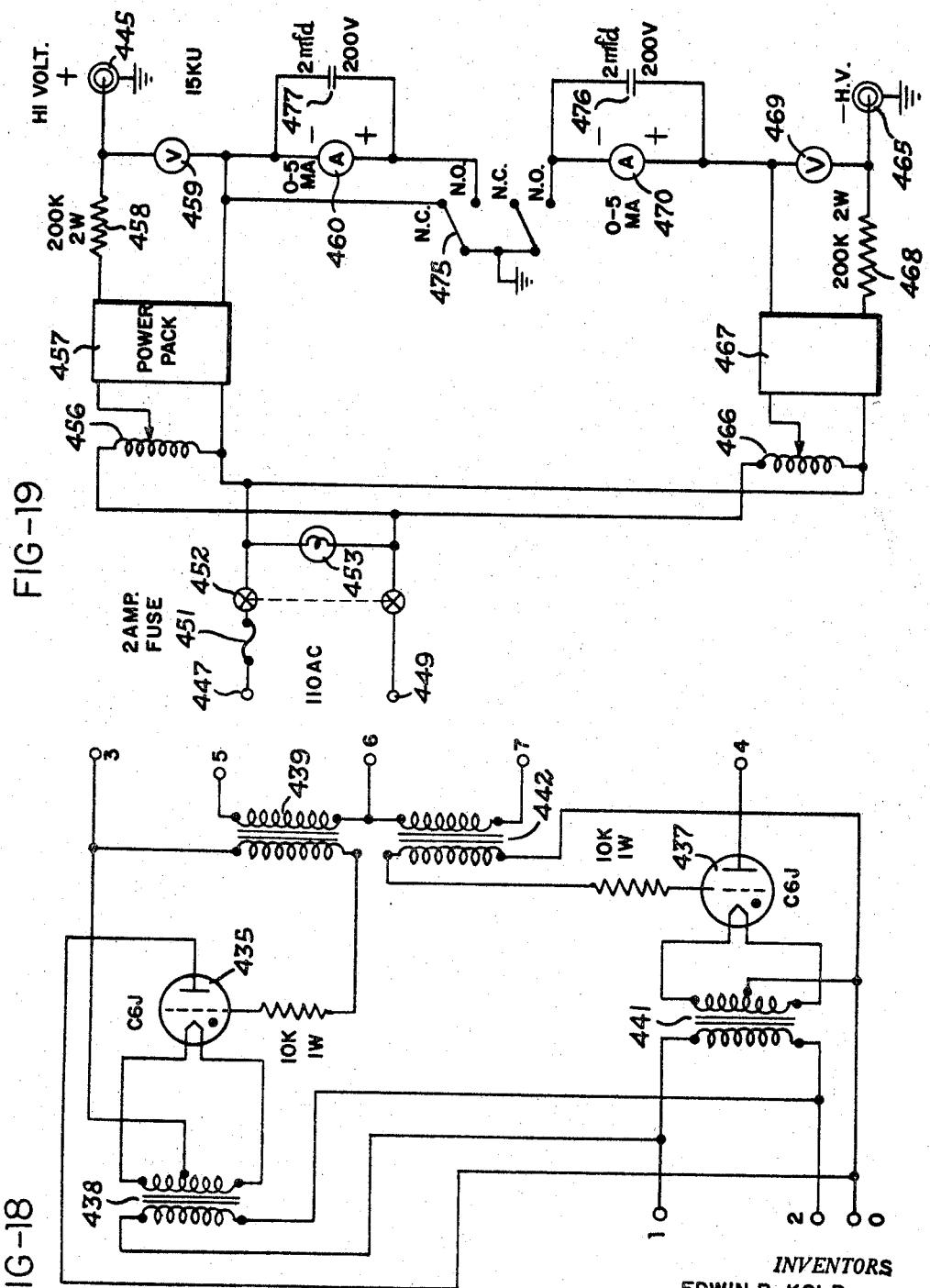

FIG-20

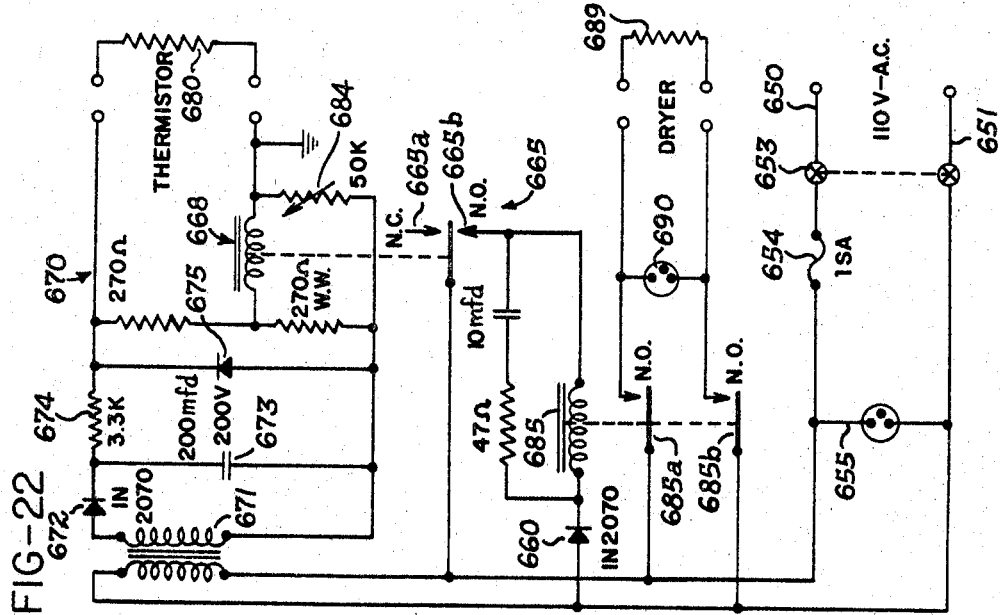
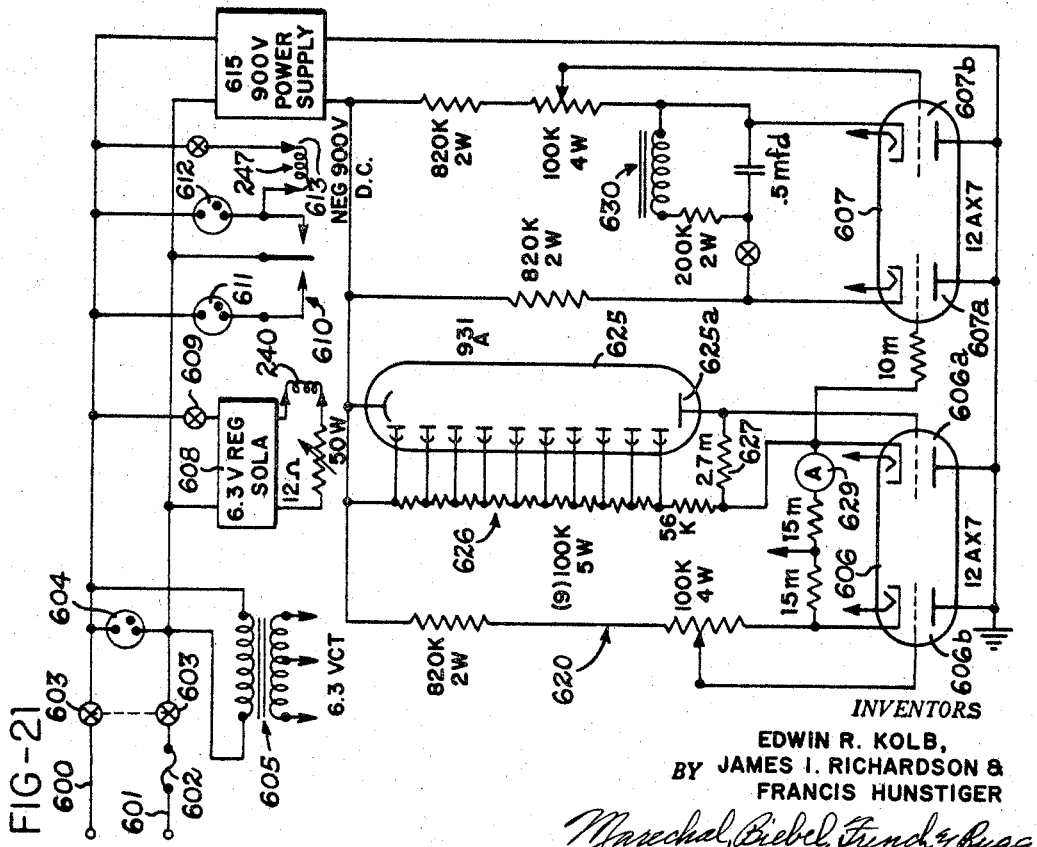

United States Patent Office 3,435,309
Patented Mar. 25, 1969

3,435,309
CORONA CHARGING UNIT
Edwin R. Kolb, University Heights, James I. Richardson, Warrensville Heights, and Francis Hunstiger, Parma Heights, Ohio, assignors to Harris-Intertype Corporation, Cleveland, Ohio, a corporation of Delaware
Original application Nov. 27, 1962, Ser. No. 240,253, now Patent No. 3,299,787. Divided and this application Apr. 27, 1966, Ser. No. 545,629
Int. Cl. H01g 3/02
U.S. Cl. 317—262                                      10 Claims

ABSTRACT OF THE DISCLOSURE

An electrophotographic printer for single or multicolor prints includes a web feeding and alignment mechanism, a charger, a developing unit, a register mark detection and control system, a toner concentration control system, and a sheeter mechanism. The charger includes a plurality of wires shorter in length than the width of the web and arranged diagonally with respect to the path of web travel thus enabling an increase in current per lineal inch of wire. The developer unit is of the drum type for use with liquid developers and includes a squeegee roller and a squeegee roll cleaner to prevent offsetting onto the web being processed. A counterelectrode system is also described.

---

This application is a division of application Ser. No. 240,253, filed Nov. 27, 1962, and assigned to the same assignee as this application, and now U.S. Patent No. 3,299,787.

This invention relates to an electrophotographic printing apparatus, and more particularly to an improved apparatus for forming enlarged prints of a micro-sized original, for example microfilm, wherein an electrostatic latent image is formed on a web or the like of electrophotographic paper and developed thereon by treatment with a developer.

In recent years, there has been increased tendency to store and provide technical information and data on microfilm or microcards due to the need for conserving storage space. While the use of microfilm or microcards is advantageous from the standpoint of reduced storage space, reproduction of the information stored on the microcards or microfilm has presented certain difficulties. The information contained on the micro-sized original may vary from line work to continuous tone or half-tone work as may occur with photographs or drawings which appear in connection with the text material present in the original document. Moreover, micro-sized originals may be utilized as masters in the formation of enlargements in one or multiple colors.

In addition to the difficulties of providing useable copies of the information stored in micro-form, there may be a further difficulty in providing copies of such material at a relatively high rate and in a relatively simple manner.

These difficulties have been overcome in accordance with the present invention by the provision of an improved relatively compact micro-printer employing the principles of electrostatic photography and employing an image carrier wherein the electrostatic image is formed and developed on that carrier utilizing an improved charging unit and an improved developer unit which cooperate to provide enlarged prints from a micro-sized original in a relatively short period of time.

It is a primary object of the present invention to provide an electrophotographic printing apparatus capable of conveniently and rapidly making copies of material in the form of micro-sized originals.

Another object of this invention is the provision of an electrophotographic printing apparatus which will automatically provide copies of a micro-size original on electrophotographic paper at a relatively high rate.

It is another object of this invention to provide an electrophotographic printer wherein the visible image is produced on the surface of an electrophotographic paper in the form of a web, and wherein the web is maintained under proper tension during the course of travel thereof thereby allowing formation of multiple images in registry.

Another object of this invention is the provision of an improved charging assembly for use with an electrophotographic printer of the type described which allows charging of relatively large areas of chargeable members in a relatively short time whereby an image may be formed and developed in a relatively short period of time.

A further object of the invention is to provide an improved system for conveniently mounting a roll of electrophotographic paper on the printing machine and maintain the paper under proper tension during passage thereof through the machine.

It is a further object of this invention to provide an improved developing unit for use with an electrophotographic printer of the type described wherein image carriers of relatively large dimensions may be conveniently and simply manipulated to develop a latent image thereon, and wherein the developing unit is capable of providing relatively good quality prints of the line, half-tone or continuous tone type of printing.

It is still a further object of this invention to provide an improved electrophotographic printing device wherein an image is formed on an electrophotographic image carrier and developed thereon by a liquid developer, and wherein the liquid developer is maintained at the proper concentration by an improved control system.

Other objects and advantages of the present invention will be apparent from the following description, the accompanying drawings and the appended claims.

In the drawings:

FIG. 4 is a view partly in section and partly in elevation as viewed from the right of FIG. 2 of the roll mounting assembly in the lowered position;

FIG. 6 is a fragmentary view of an improved corona charging assembly constructed in accordance with the present invention;

FIG. 7 is a view partly in section and partly in elevation taken generally along the line 7—7 of FIG. 6;

FIG. 8 is a view of the support member for the corona wires as shown in FIGS. 6 and 7;

FIGS. 9–12 are schematic views of several developing units which may be employed in accordance with the present invention;

FIG. 15 is a somewhat diagrammatic view, with portions thereof broken away, of a multicolor electrophotographic printer constructed in accordance with the present invention;

FIGS. 17–22 are schematics of the electrical circuits which may be employed in the electrophotographic system of the present invention.

Figure 1:
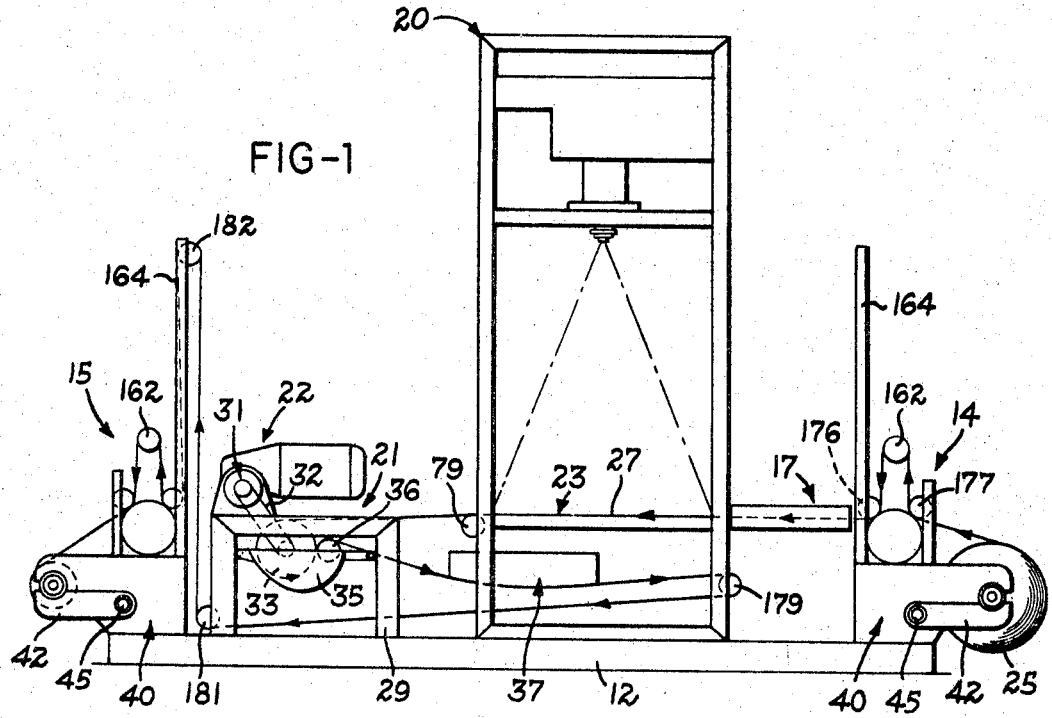
FIG. 1 is a somewhat diagrammatic view of the electrophotographic printer of the present invention.

Referring to the drawings, which illustrate preferred embodiments of the present invention, FIG. 1 shows an electrophotographic microfilm enlarger including a base 12 upon which is mounted an unwind reel and web tension assembly 14 and spaced therefrom a rewind reel and web tension assembly 15. Positioned between the assemblies 14 and 15 is a charging unit 17, a projection station 20, and a developing station 21 (including a web pull-through motor 22). A web 23 which comes off a supply roll 25, supported by the unwind reel assembly 14, is advanced through the machine by the pull-through motor 22. The web 23 includes an electrophotographic layer on its upper surface 27 of the type described in application Ser. No. 640,353, filed Feb. 15, 1957 and assigned to the same assignee, now abandoned in favor of continuation application Ser. No. 612,732, filed Jan. 30, 1967.

The developing station 21 is supported on the base 12 by a further support frame 29 which also acts as a support for the pull-through motor 22. A gear reduction unit 31 connects the motor 22 through drive belt 32 to a developer roller 33 positioned transversely of the path of travel of the web and rotatably mounted in a developer tank 35 supported by frame 29 so that the web of paper passes around the outer periphery of the roller 33 and a squeegee roller 36 to a drying unit 37 also supported over the base 12 beneath the projection unit 20.

Figure 2:
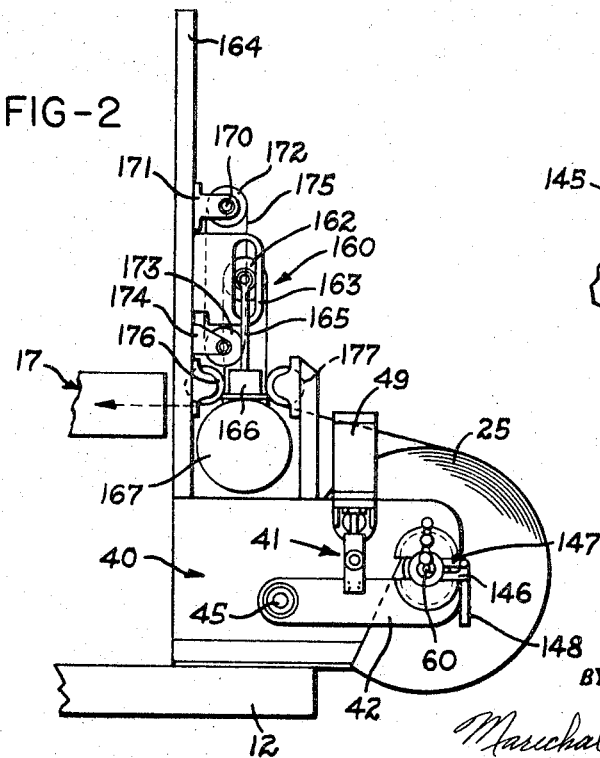
FIG. 2 is a view of the web tensioning assembly employed with the electrophotographic printer of this invention.

The unwind and rewind reels 14 and 15 shown in FIGS. 2 and 4 are of virtually identical structure and include a reel support stand 40, mounted on the base 12, and an assembly 41 for raising the supply roll 25 into position on the stand. The assembly 41 includes a pair of movable support arms 42 for each reel assembly, one of which is mounted on each side of the stand 40 on a bearing 43, and connected together by shaft 45 for pivotal movement with respect to the stand. Lateral movement of the shaft is prevented by locking collars 47 held in place on the inside of the stand 40 by set screws 48 or the like. Means in the form of fluid operated piston and cylinder assemblies 49 having their piston arms 50 pivotally connected to support arms 42 as shown at 52 are provided for raising and lowering movement of both support arms 42 in unison.

To the right of the reel stand as viewed in FIG. 4 is a motor 55 suitably connected to a gear assembly 57 supported in a gear housing 58 and mounted on the stand 40 by bolts 59. When the arms 42 are in the raised position, as shown in dotted lines, a driving connection is made to a core shaft 60 by lugs 62 which are received in lug holes 63 provided in the inside face 64 of gear 65. The driving connection between the core shaft and the gears is broken prior to lowering the arms 42 for placing a new roll of paper on the machine.

The hollow core shaft 60 has a clutch shaft 68 positioned in the center thereof which is provided with a portion 69 of reduced diameter at one end thereof. Positioned over the reduced diameter portion 69 of the clutch shaft is a clutch plate 70 having the lugs 62 projecting therefrom for driving engagement with gear 65. Pins 71 are received within holes provided in the plate 70 and engage the reduced portion 69 of the clutch shaft 68 to form a lost motion linkage. As clutch shaft 68 is moved laterally to the left, as viewed in FIG. 4, the shaft engages the pins, and the clutch plate 70 is moved a distance sufficient to allow the lugs 62 to clear the lug holes 63 and the inside face of gear 65.

The end of the core shaft 60 near the gear assembly 57 is keyed in driving relation with a clutch drive plate 75 by a key connection 76, the clutch plate 70 being affixed to the drive plate 75 by the lugs 62 or bolts and the like. Between the end of the core shaft 60 and the clutch plate is a spring 77 surrounding the plate 70 and urging it and the driving plate 75 toward the gear assembly 57.

The left end of the core shaft 60 (as viewed in FIG. 4) is threaded to receive a centering plug 79 which centers this end of the clutch shaft 68. Centering plug 79 is keyed for lateral passage of a pin 82, while a fixed collar 84 and spring 85 are positioned around the clutch shaft 68. By pulling on handle 87 of the clutch shaft against pressure of the springs 77 and 85, the clutch drive plate 75 and clutch plate 70 are moved to the left, as viewed in FIG. 4, to disengage the lugs from the lug holes, and thus break the driving connection between the core shaft and the gear assembly.

The core shaft 60 is supported in the support arms by bearing assemblies 90 and 92, the former being fixed on the core shaft while the latter allows the shaft to be moved relative thereto. Bearing assembly 92 includes a housing 93 with needle bearings 95 therein, and between the core shaft and the inner raceway there is a key connection including a key 97 and springs 98. Accordingly, when bearing assembly 92 is fixed in the support arms, the core shaft may be moved laterally and springs 98 operate to center the bearing assembly on the shaft when the shaft is taken off the support arms, as will be described more fully hereinbelow. Bearing 90 includes a housing 99 for the ball bearings 100, the housing being fixed to the core shaft 60 by suitable means well known in the art. In the raised position, each bearing is clamped in position between the arms 42 and the stand 40 as will be described more fully in connection with FIG. 5.

Means are provided for moving the core shaft laterally in the raised position and include a laterally movable crank block 102 secured in a block housing 103 which in turn is fixed to the stand 40. The block 102 which engages the upper half of bearing housing 99 may be moved within the housing by crank 105 which is threaded therethrough and the block includes a land 106 along its outer periphery which is received by groove 108 of the bearing housing 99 when the core shaft is in the raised position as shown in dotted lines. The arm 42 adjacent the bearing assembly 90 includes a pillow block 110 engaging the bearing housing 99 along the lower half thereof, and is movable laterally with the crank block 102.

A first and second core collet 115 and 120, respectively are provided for securing the core of paper roll in driving relation on the core shaft. Core collet 115 includes a split collar 121 which is releasably clamped to the core shaft by bolts 123 (one being shown) and which compress the collar around the shaft. A removable key 127 secured to the core collet 115 is provided for engagement with slots in the paper core 130 thereby securing one end of the core in driving relation to the core shaft. The second core collet 120 includes a male member 131 having a split collar 132 releasably affixed to the shaft 60, and a female member 133 which is screw threaded over the male member. The male member is provided with a peripheral seat 134 which receives a ring 135 of compressible material, such as rubber and the like, while the female member includes a face 138 for compressing the rubber ring 135 in the seat and causing it to expand for releasable resilient engagement with the inner surface of core 130. In this way, the shaft is centered in the core of the roll and there is a positive driving connection between the core and the shaft. Compression of the ring 135 may be effected by using a spanner wrench which is received within a plurality of apertures 139 in the female member 133. Like the male member, the female member 133 includes a split collar and bolt arrangement 140 for locking it on the core shaft once the rubber ring is compressed.

Figure 5:
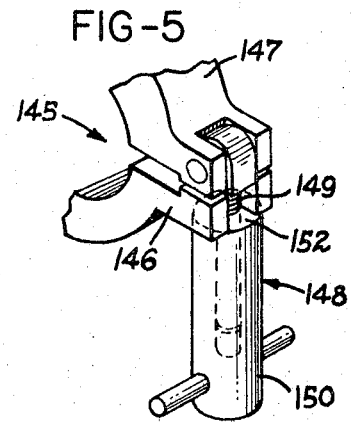
FIG. 5 is an enlarged view in perspective of the clamp assembly for the latch arms.

Referring to FIG. 5, the bearing assemblies are held in a fixed position by a bearing and core shaft clamp assembly 145 including a clamp arm 146 movable with the support arm 42, and a clamp arm 147 fixed to the stationary frame 40. A clamp lock 148 including a threaded shank 149 receiving a clamp collar 150 is provided for securing the clamp arms together. By unscrewing the collar 150 a sufficient distance to provide clearance between its face 152 and the notched end of arm 146, the lock may be pivoted upwards to release the support arms.

A web tensioning device 160 is provided in each reel stand to assure desired control of tension thereby providing accurate control of the stretch of the electrophotographic paper in instances where multiple images are to be formed thereon. For example one type of electrophotographic paper has a modulus of elasticity of 2,150 pounds per inch so that a tension change of about .48 pound per inch would result in a stretch of about .005 inch in a sheet having a 22½ inch length.

Figure 3:
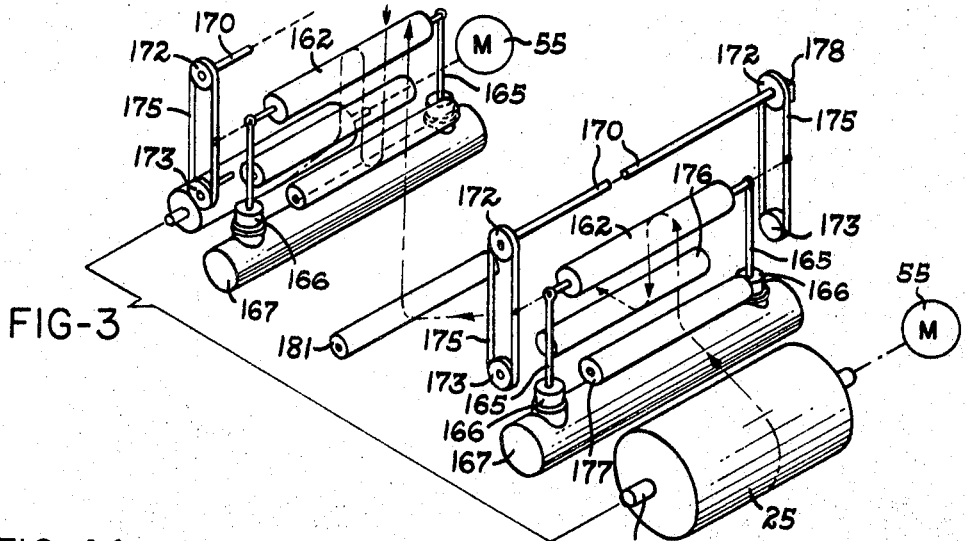
FIG. 3 is a diagrammatic view of the web transport system showing the passage of the paper through the tension assembly.

Referring specifically to FIGS. 2 and 3, the web tension device is generally the same for both the unwind and rewind assemblies and includes a lightweight floating roll 162 having ends of reduced diameter mounted in ball bearings which move vertically in the guideway brackets 163 affixed to the vertical support member 164 mounted on the reel stand 40. On each end of the floating roll 162 there is connected a piston rod 165 exerting an upward force on the floating roll. The upward force is supplied by two air cylinders 166, preferably of a bellows diaphragm type, connected to an air reservoir 167, the reservoir being secured to support member 164 and forming a structural member across the base of the tensioning device. The use of bellows diaphragm seal piston units offers the advantages of minimum friction, and mounting them directly on the reservoir reduces constrictions in the air flow between the cylinders and the reservoir.

Positioned above the floating roll 162 is a rotatable torque tube 170 supported in bracket 171 carried by the vertical support stand 164. Rigidly affixed to each end of the torque tube 160 is a pulley 172, while two pulleys 173 are each rotatably mounted on bracket 174 secured to the vertical support stand 164 outside the path of the web. A steel tape 175 is reaved around each set of pulleys 172 and 173 and each tape is affixed to its pulley 172 and to the adjacent end of the floating roll 162 at the point where that roll is connected to the piston rod 165. A pair of guide rolls 176 and 177 are mounted in spaced parallel relation below the floating roll 162 such that the movement of the floating roll 162 is in a vertical direction and generally parallel to each of the guide rolls.

Due to pressure in the air reservoir, the bellows diaphragm units apply a force to the floating roll 162 tending to urge it upward, the force on this roll being approximately twice the resultant tension in the web. The limit of movement of the floating roll in either an upward or downward direction is adjustable by means of set screws, not shown, and provided in the guideway bracket 163 (FIG. 2) in order to limit the range of movement of the floating roll. The torque tube and associated pulley assemblies tend to maintain the floating roll positioned in generally parallel relationship to the guide rolls 176 and 177. If the length of the web between 176 and 177 decreases, the floating roll 162 moves downward towards the air reservoir 167 resulting in a movement of the steel tapes 175, and clockwise rotation of the torque tube as viewed from the left in FIG. 3. Affixed to one end of the torque tube is a transducer 178, which may be a potentiometer, for example, and which is operative to sense the amount of rotation of the torque tube, and the position of the floating roll. As the floating roll moves downward from its equilibrium position, a signal from the potentiometer is fed to motor 55 through an appropriate control circuit to increase the rate of unwind of the motor thereby enabling the floating roll to return to its equilibrium position due to the upwardly directed force of the piston units. On the other hand, as the length of web between guide rolls 176 and 177 increases, the floating roll 162 moves upward from its equilibrium position causing movement of the steel tapes and counterclockwise rotation of the pulleys. This change in position of the floating roll is sensed by the potentiometer, as above described, and a signal is fed to decrease the rate of unwind of motor 55 thereby allowing the floating roll to be repositioned at its equilibrium position.

The advantage of the web tension system above described is the fact that tension is maintained substantially at a constant level in the web at all times, even when the web is not moving through the machine, and the air pressure acting on the floating roll through the piston assembly determines and produces the tension in the web while the motor unit 55 allows the web to leave the reel stand at the pull through rate in order to maintain the floating roll in its equilibrium position. It is preferred that all moving parts be structurally rigid and as light as possible in order to provide moving parts which have as low an inertia as possible and thereby to reduce to a minimum the dynamic forces which may tend to alter the constant tension properties of this tension control system.

Asuming that there is no roll on the machine and the clamp arms 146 are up and locked, the threading or "web-up" procedure is as follows: Handle 87 is pulled and locked, by turning it a quarter turn, to move the clutch shaft 68 thereby moving the clutch plate 70 and lugs 62 out of driving engagement with lug holes 63, as previously described. Thereafter, each clamp arm lock 148 is released by backing off the clamp collar 150 a sufficient distance to clear arm 146, and the air cylinders 49 are actuated to lower the support arms 42 on which the core shaft 60 is cradled. The core shaft with the bearings thereon is removed from the arms and the female member 133 of core collet 120 is unlocked and backed off as previously described. The core shaft is inserted into the core of a roll so that the sensitive surface will face the projection station as the paper leader is fed through the machine, and the key 127 of core collet 115 is aligned with the slots in the core. The other end of the core is secured by tightening the female member of collet 120 to compress the rubber ring 135 which expands and engages the core, and the core collet 120 is locked and the roll is moved into position with the bearings aligned with the bearing clamp assemblies. As previously noted, bearing 92 is centered on the shaft by springs 98.

The cylinders 49 are actuated to raise the arms 42 and the clamp assemblies are locked by engagement of the face 152 of each collar 150 with the underside of the notched end of each clamp arm 146. The clutch shaft is released and the roll is rotated, if necessary, to align the lugs which are urged into engagement with the lug holes, because clutch plate 70 is spring biased by spring 77 towards gear 65. Having completed the driving connection between the core shaft and the gear assembly, the roll may be aligned by turning crank arm 105 which moves the core shaft and bearing 92, while bearing 90 remains fixed within the clamp arms. Once aligned, a leader of paper is fed under roller 177 and over the floating roll 162 and beneath guide roll 176 (FIG. 3). The paper is then fed through the charger 17, through the projection station 20 and through the developing station 21.

In the developing station, the web travels about the outer periphery of the developer roller 33 such that the surface of the web may be treated with a suitable liquid developer and exits through a squeegee 36 as will be described more fully hereinbelow. The web leaving the developer unit 35 is passed beneath a heater unit 37 around a roller assembly 179 to a roller 181 and up around a roller 182 on the vertical support stand 164 and through the rewind reel tensioning unit to the rewind reel as shown in FIG. 3.

One important aspect of the electrophotographic microfilm enlarger of the present invention relates to an improved corona charging unit as shown in FIGS. 6 through 8. With conventional two-sided charging units of the prior art, wherein the wires are positioned in parallel relationship and in a direction generally perpendicular to the path of travel, approximately 8 to 10 microamperes of corona current at about 6,000–7,000 volts are applied per each inch of wire. In instances where the web has a width of about 30 inches, such relatively high currents are utilized to provide suitable charging in order to provide good quality prints in a minimum of time. The disadvantage of such a prior art unit is that currents in excess of about 10 microamperes per inch of wire, for example, 12 to 20 microamperes per inch of wire, tend to move the wire towards the metallic back plate or grounding structure, due to the attraction thereto, resulting in arcing and/or improper charging of the electrophotographic member. As can be understood, such increased current may be required in order to increase the rate of charging for providing prints on a relatively large sheet member at a relatively rapid rate.

The above disadvantages have been overcome in accordance with the present invention by the provision of a compact corona charging unit as shown in FIGS. 6 through 8. The unit 17 includes an electrically insulating housing 185 formed of a plurality of members 186–189, of an electrically insulating material such as phenolic resin, which are secured together by screws or other suitable means. Between members 187 and 188 there is provided an aperture 190 for passage of the web member 23 such that the web passes between two corona charging assemblies generally designated 191 and 192. Corona generating unit 191 is secured between members 186 and 187 while corona generating unit 192 is secured between members 188 and 189 such that the corona generating units are positioned in opposed spaced relationship.

Each of the corona generating units includes a generally rectangular frame 195 as shown in FIG. 8 across which are disposed a plurality of fine wires 196 generally arranged in parallel relationship and parallel to the path of travel. The frame is preferably metallic so as to electrically interconnect the wires and is secured within the housing so that each wire is arranged at an acute angle or diagonally with respect to the path of web travel. Each of the wires is secured to the frame by means of a spring member 197 for maintaining the wire under tension. The springs which support the wires are affixed in the notches 198 located along the inner periphery of the metallic frame 195. Located in spaced relationship to each of the corona generating units 191 and 192 are conductive back plates 200 and 201, respectively, supported in position on the frame by insulating covers 202 and 203, the plates being attached to the insulating cover by screws 204 or the like.

In instances where the improved two-sided corona unit is employed with webs of approximately 30 inch width, it is preferred that about 25 wires spaced apart approximately ⅞ of an inch be employed, the length of wires varying from 2 to 21 inches, and each wire of the plurality of wires being shorter in length than the width of the path of travel.

In operation, the backing plates 200 and 201 are grounded through a suitable lead attached thereto, while a potential of one sign is applied to corona generating unit 191 and a potential of an opposite sign is applied to corona generating unit 192. For example, unit 191 may be positive or negative while unit 192 is negative or positive respectively. A major advantage of the improvement of the two-sided corona unit above described is the fact that the supporting structure is of electrically insulating material with the exception of those elements which must be metallic in order to conduct electricity and thus the wires are not distorted by attraction to any unnecessary surrounding metallic housing. Additionally, since the wires are spaced at an angle with respect to the path of web travel, the overall length of the wires may be decreased with the longest wire being considerably shorter than the length of the long side of the rectangular frame thus allowing application of higher currents per inch of wire. Similar results may also be achieved by positioning the charger unit above described at an angle with respect to the direction of web travel so that the corona wires are approximately perpendicular to the path of web travel while the frame is arranged diagonally with respect thereto.

In instances where a 30 inch web is utilized as the image carrier, satisfactory results at charging rates up to 32 inches per second have been achieved using a unit which measures 10½ x 33 inches and ground plates which are 8½ x 31 inches. With such a unit, currents of the order of 3 to 4 microamperes per inch may be utilized which are equivalent to the 10 microamperes per inch of the prior art units, and it is possible to utilize currents of about 12 to 20 microamperes per inch without causing arcing.

Due to the fact that the relatively efficient and compact charging unit has been provided, the overall speed of the process may be improved by providing a compact developer unit which is capable of developing images at a rate faster than, or at least as fast as, the rate at which the image carrier is charged. Such an improved developer unit may be of the type shown in FIGS. 9 through 13 for example. The unit is positioned in the developer station shown in FIG. 1 for example. In one form, as shown in FIG. 9, the unit includes a developer tank 210 extending transversely to the direction of web travel, and supported by the supporting frame elements of the machine. Positioned within the tank 210 is a developer drum 212 around which the web 23 is advanced with the sensitive surface of the web facing outwardly. Positioned on the upturning side of the developer drum 212 is a squeegee roll 214 and a scrubber sponge 216 positioned in contact with the lower surface of the squeegee roll. A nip 217 is present between the squeegee roller and the developer drum so that the image with the developer thereon is squeegeed dry and a substantial portion of the developer vehicle is removed. Disposed in the developer tank 210 is a liquid developer 218 of the type disclosed in either of applications Ser. No. 762,756, filed Sept. 23, 1958 and Ser. No. 115,643, filed June 8, 1961, and both assigned to the same assignee as this application, now U.S. Patent Nos. 3,311,490 and 3,241,957, respectively The squeegee roll 214 is formed of gelatin, natural or synthetic rubbers or other suitable material, and the wiper 216 contacts a portion of the outer surface of the squeegee roll in order to remove therefrom any toner which is split from the developed image, thus preventing offset of developer toner to subsequently developed images. With this unit, high contrast line work is possible, and it has been found that with positively charged toner particles a small positive bias in the order of 50 volts DC applied to the developer drum 212 with respect to the tank 210 and the squeegee 214 assists in reducing background.

The developer unit shown in FIG. 10 is similar in operation to that shown in FIG. 9 but includes a counter-electrode 220 which is in the form of a perforated or apertured plate or wire mesh and positioned in concentric relationship with the outer surface of the developer drum 212 which is beneath the level of the developer dispersion 218. This electrode when added to the structure shown in FIG. 9 assists in filling in solids so that the image appears dark in the center of relatively large areas.

Another modification of the developer unit is shown in FIG. 11 in which a small roller 225 serving as a counter-electrode may be positioned a very small distance from the bottom of the developer drum 212. With paper of ordinary thickness, a spacing of 0.008 of an inch has been found satisfactory. As shown in the drawing, the tank 210 includes a sump 226 to accommodate the roller 225 which operates in effect to carry a film of developer into contact with the web of paper 23 moving about the outer periphery of developer drum 212. As with the developer units previously described, a squeegee roller 214 is positioned against the developer drum 212 on the upward turning side thereof to remove excess liquid from the print.

With the unit shown in FIG. 11, it is desirable to utilize the roller 225 as a counter-electrode so that solids will be filled in during development. Moreover, since the roller is positioned relatively close to the developer drum 212, it has been found that rotating the roller 225 at a speed greater than the rate of rotation of the developer drum operates to bring more toner into contact with the surface of the paper. It is understood however, that this roller should not be rotated at too great a speed since it will tend to drag off the developer which has been deposited on the web 23.

The developer unit shown in FIG. 12 incorporates all the desirable features of the unit shown in FIGS. 9–11. As in the case of the other units, the web 23 is moved around the outer periphery of a developer drum 212 which is positioned within the tank 210. A squeegee roller 214 and associated cleaner 216 is positioned so as to remove excess liquid adhering to the web. A liquid developer 218 is disposed in the tank so that the drum 212 is immersed in the developer allowing approximately 11 inches of the web to be submerged if an 8 inch diameter developer drum is utilized, for example. Positioned in the tank and around the outer periphery of the developer drum 212 are a plurality of counter-electrode rollers 227 which may be spaced as close to the paper as possible, and a spacing of about .008 inch from the developer drum has operated satisfactorily. These rollers are rotated at a peripheral speed in excess of the peripheral speed of the developer drum 212 so as to bring fresh toner in close proximity to the web surface. In addition, each roller is individually cleaned by a sponge element 228 so that if a bias is applied across the rollers and the drum, little toner will build up on the rollers. As described above, the rollers act as a counter-electrode to enhance the image field in the developer liquid.

Figure 13:
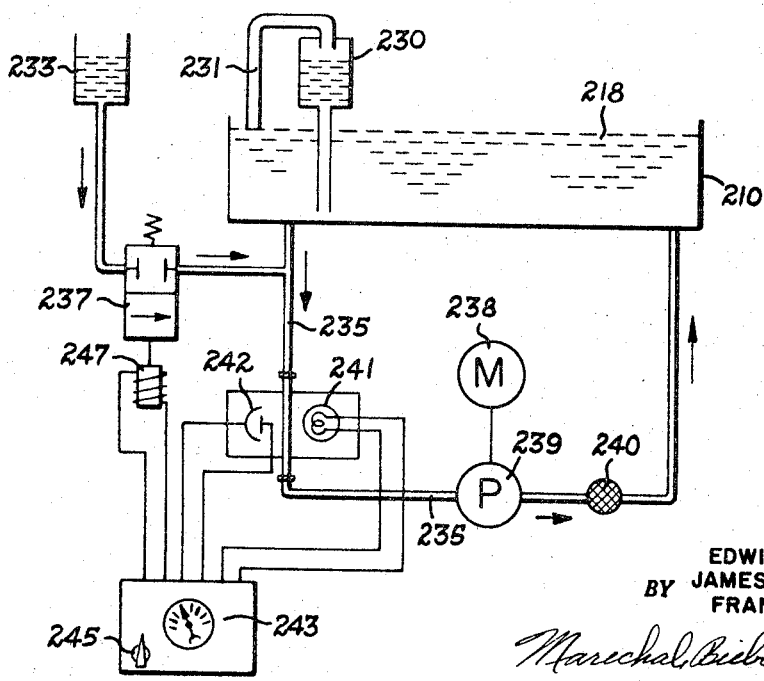
FIG. 13 is a schematic view of the toner concentration control unit employed with the electrophotographic printer of the present invention.

Utilized in conjunction with the developer units above described is a developer control system shown in FIG. 13 which operates to maintain the developer at proper toner concentration and provides a means for replenishing the toner as it is used up during operation of the machine. Arranged in fluid communicating relationship with the developer tank 210 containing developer 218 is a thinner supply assembly 230 which operates on a level control principle such that as the level of developer 218 drops below the bottom end of tube 231, additional thinner is supplied to the tank. Toner in concentrated form is stored in the toner concentrate tank 233 and allowed to flow into recirculation conduit 235 as controlled by the solenoid valve 237. Developer is continuously circulated through conduit 235 by a motor 238 which operates a pump 239 to force the developer through a filter 240 and back into the tank 210 as indicated by the arrows. As developer moves through conduit 235 it passes between a photocell 241 and light source 242 which operate to read the concentration of the developing solution, and supply toner concentrate thereto as required. A meter 243 is provided for rendering a visual indication of the toner concentration, and an adjustment control knob 245 is provided in order to vary or adjust the system, as described.

In operation, as the photocell senses a decrease in optical opacity in the developing solution, and a signal is fed through an appropriate circuit and compared to the signal representing the desired concentration, as selected by knob 245. If the developer is low in concentration, a solenoid 247 is energized and valve 237 is moved so as to allow concentrate to flow into conduit 235. As the toner concentrate passes the photocell or sensing station, the photocell will indicate that it is above the desired concentration and solenoid 247 will actuate to shut valve 237. This closely timed sequence effectively limits the amount of concentrate added at any one time and prevents excessive toner concentration. The concentrate is then forced through conduit 235 into the tank 210 and mixed with the remaining developer 218.

As will be understood, a slight excess of toner over that required may be tolerated, and may result in slightly darker prints, while a deficiency of toner seriously affects contrast. The system above described operates to maintain the toner concentrate above a predetermined minimum required to provide prints of good quality, and is quite successful in maintaining the concentration of toner within prescribed limits. The rate of developer recirculation is sufficiently high to effect substantially complete intermixing of the toner concentrate and the remaining developer 218 in the tank.

Figure 14:
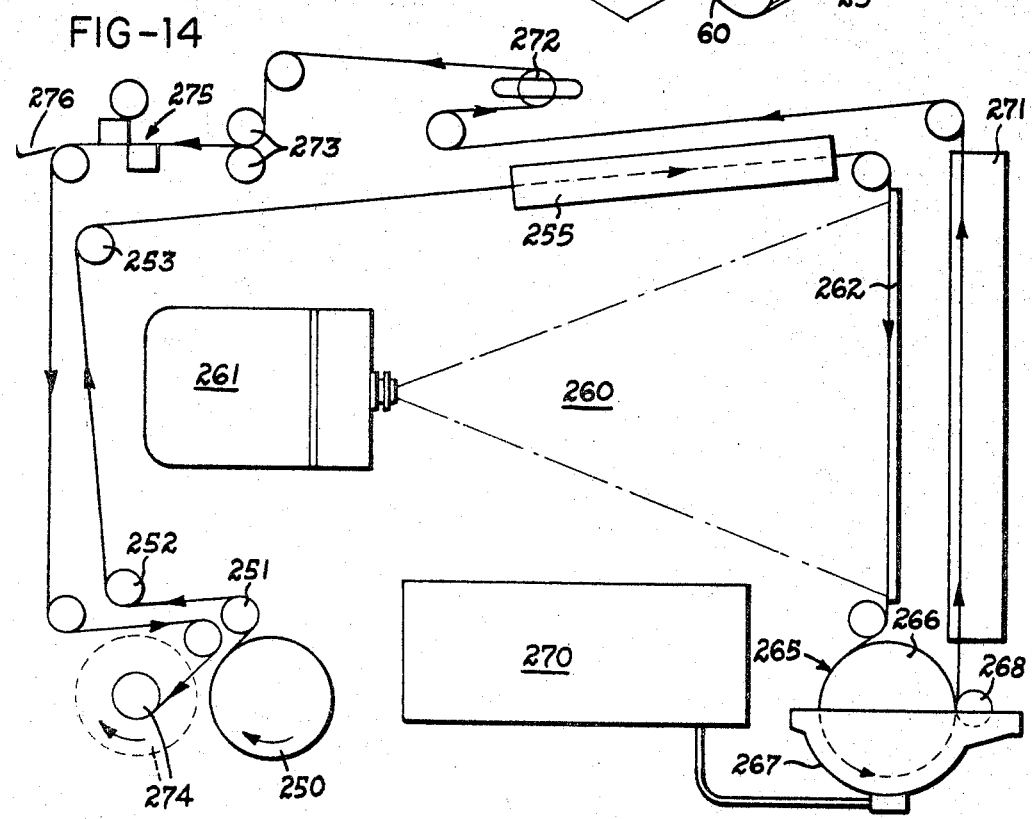
FIG. 14 is a schematic view of a modified form of the electrophotographic printer shown in FIG. 1, and includes a sheeting unit for severing the web into various sizes.

The physical arrangement of the several elements of the machine previously described may be rearranged somewhat for compactness and efficient operation. Referring to FIG. 14, a supply roll 250 is supported within a frame not shown, so that the web of paper is fed through a series of guide rolls 251, 252 and 253 to a charger unit 255. From the charging unit 255, the paper is advanced to an exposure station generally designated 260 and a latent image is formed on the surface of the paper. In the exposure station, there is located a microfilm projector 261 and a paper supporting table 262. The paper with the latent image thereon is advanced to a developer station 265 including a developer roller 266 disposed in a developer tank 267. On the upward turning side of the developer roller is positioned a squeegee roller 268 for removing residual developer liquid as previously described. Associated with the developer station is a toner concentration control unit 270 similar to that previously described in connection with FIG. 13.

As the paper leaves the developer station it is passed through a dryer unit 271 and over a compensating roll 272 through a pair of pull rolls 273 and thence to a take-up reel 274. If the web is to be sheeted, a sheeter mechanism 275, arranged as shown, may be used and the cut sheets are delivered to the delivery tray 276.

The microfilm projector utilized with the units shown in FIG. 1 or FIG. 14 may be of the type including a flash tube, a condensing lens system, a transparency holder with adjustment, a projection lens and a projection table which supports the paper during exposure. It is desirable to use a flash tube assembly which provides a high intensity light for a fairly short interval so that the image may be formed without requiring the paper to stop at the projection station. Satisfactory results have been achieved utilizing the flash tube assembly of the FT 524 electronic flash tube type which is cooled by blowing air over it. The circuit for this unit will be described more fully hereinbelow.

Another aspect of the present invention relates to an electrophotographic apparatus capable of producing multicolor prints on a web of electrophotographic paper. As will be apparent from the following discussion, many of the components of the multicolor unit are those utilized in the single color unit previously described. Referring particularly to FIG. 15, a supply of paper 300 is supported on the unwind reel stand 302 of the machine. The paper is fed through the web assembly 303 to the first charging station 304 such that the electrophotographic surface thereof is given a uniform charge as previously described. From the first charging station, the paper is advanced to the first exposure station 305 including a web support plate 307 and a microfilm projector 309 supported on the frame 310 of the machine. The microfilm projection equipment is preferably a flash type unit adapted to provide high intensity illumination for a short period of time thereby rendering unnecessary any stoppage of the web during the exposure interval.

Once the web has been exposed, an electrostatic latent image is formed thereon, as is well understood in the art, and subsequently developed by passage through a first developing station 315 which may be of the type described in connection with FIGS. 9 through 12. Since the electrostatic latent image formed in the first exposure station represents only one color of a multicolor image, the liquid developer present in the first developing station 315 is selected so that it will provide a color corresponding to the color of light separation microfilm representation of the first color of the composite color image.

As was previously described, the image is squeegeed and may be passed through a dryer unit 317 to evaporate residual vehicle, although it is understood that the dryer unit 317 is not necessary since the image is sufficiently fixed subsequent to the removal of the web from the developing station to allow further handling. The mechanics and theory involved in such a fixing operation have been described in copending application Ser. No. 115,643, filed June 8, 1961 and assigned to the same assignee.

After printing of the first image, the web may be passed through a series of stations which will in sequence apply a charge, expose the charged web and develop the charge image. Provision is made in the subsequent stations for recognizing a registration mark which is placed on the paper during formation of the first image. This registration mark is utilized in all subsequent exposures to trigger the flash unit so as to provide multi-images in registry. In each instance, the electrostatic latent image which is formed in any particular station represents a particular color of a composite multi-colored image and is developed by a liquid developer of suitable color.

As the web enters the last station, it is given a uniform charge at charging station 320, exposed at station 322, developed at station 324 which has mounted thereon a pull-through motor 325. The developed image is then transported through the web tension assembly 326 to a take-up reel 330 mounted on the frame of the machine, and described previously.

It is to be understood, that each of the stations between the first and the last is substantially identical to the arrangement described in connection with the one color printing previously described, except that the color of the developer will be different in each station as well as the pattern of light projected at each station.

Figure 16:
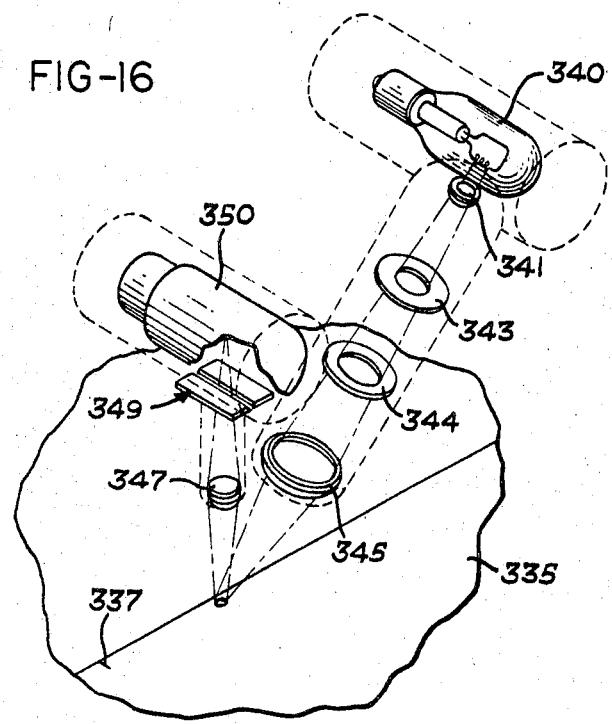
FIG. 16 is a diagrammatic view of the register mark detection system for achieving register on successive prints constructed in accordance with the present invention.

The register pick-off unit may be understood with reference to FIG. 16 which is a fragmentary view of a web of paper 335 having an index mark 337 thereon moving beneath the pick-off station. A suitable light source 340 including a projection lamp, a lens system 341, light stops 343 and 344, and a second lens 345 projects a spot of light along one edge of the web. Light is reflected from the web 335 through a photocell lens system 347 and through a masking plate 349 to a photomultiplier tube 350. As the register mark passes through the spot of light, the intensity of light entering the photomultiplier is decreased. The signal is generated when the mark is at a precise position within the illuminated area, i.e., precisely when the image of the mark traverses the aperture in the masking plate. By a suitable electrical circuit, the flash tube of the projection system is energized for projecting a light image onto the surface of the web as the leading edge of the register mark passes the detector.

In a multicolor printing apparatus of the type previously described, or in the single color apparatus previously described, the projected image may be aligned at each station by focusing and registering the projected images with reference to the index mark. Once this procedure has been accomplished, production of multicolor images is possible automatically with the multicolor apparatus. In the case of the single color apparatus, the web of paper can be rewound and run through a second time to form a second image or a multiple number of times to form multiple images in one color, which are in registry and form a composite multicolored image. When the single color unit is utilized to form multicolor images, a registry pick-off of the type previously described is utilized to pick-off the register mark and trigger the flash for providing subsequent images in register with those previously formed and developed.

FIG. 17 illustrates a portion of the electrical circuit utilized with the one color machine previously described. A 110 volt A.C. supply is applied across supply terminals 360 which include a fuse 361, a main power switch 362, and a pilot light 363. When switch 362 is closed a timer 365 is energized such that after sixty seconds, power is applied to the thyratron control circuits 370 and 375 (see FIG. 18 for details) and pilot light 376 comes on. This delay protects the thyratrons by allowing them to warm up before the plate circuit is energized.

Shown immediately above the timer 365, are a pair of normally open web break detector switches 377 and 379 which operate to open the supply circuit of the timer and prevent operating voltage from being applied to the motors at such time as the paper web is broken. A normally open manually operated switch 380 is included in the web break detector circuit so as to override or short out the switches during the web-up or threading procedure for the machine.

After the timer has closed, current flows through relay coil 385 which transfers contacts 386 which in turn applies an A.C. voltage across the thyratron control circuits, and a 220 volt autotransformer 390 provides the A.C. voltage across the thyratron control circuit plates. The supply terminals are also connected across the autotransformer 395 which provides the input power for the bank of capacitors 400, and control potentiometer, to be described below, which apply the proper phase voltage to the grids of the thyratrons. The thyratron control circuit 370 controls the power supply to the armature 405a of the rewind motor 405 of the rewind reel stand, which may be a three-quarter horsepower 2400 r.p.m. motor. The thyratron control circuit 375 controls application of power to the armature 410a of the unwind motor 410 of the unwind reel stand, which also may be three-quarter horsepower 2400 r.p.m. motor. The pull-through drive motor 415 (corresponding to 22 of FIG. 1) includes field windings 415a and a rotor 415b, and the control circuit therefore includes a reversing switch 417 for reversing the connection to the rotor 415b. A full wave rectifier 419, including four 1N1126 diodes, is utilized to supply the proper D.C. voltage to field windings 405a, 410a and 415a, respectively, of the rewind motor 405, the unwind motor 410 and drive motor 415. A second full wave rectifier 420 is utilized as a D.C. power source for the rotor 415b. The circuit for the drive motor also includes a speed control element 425 which may be a Variac or similar variable autotransformer in the supply to rectifier 420.

As will be noted from the wiring diagram, the rewind tension control potentiometer 427 (corresponding to potentiometer 178 of FIG. 3) is arranged to cooperate with the capacitors providing variable phase voltage to the thyratron circuit 370 to control the rewind motor 405, while the unwind tension control potentiometer 430 is arranged to cooperate with the capacitors 400 providing variable phase voltage to the thyratron circuit 375 for control of the unwind motor 410.

The rewind and unwind thyratron circuits are essentially the same, as shown in FIG. 18, and are placed in the circuit shown in FIG. 17 by matching up the numerals on the pins. Each thyratron unit includes two C6J tubes designated 435 and 437, and associated filament and grid transformers. Transformer 438 having a winding ratio of 1 to 46 is utilized as a filament transformer for tube 435, while transformer 439 having a winding ratio of 1 to 19 is utilized as a grid transformer. Similarly, thyratron tube 437 has a filament transformer 441 with a winding ratio of 1 to 46 and a grid transformer 442 having a winding ratio of 1 to 19.

The high voltage supply for the corona generating units is shown in FIG. 19, wherein 110 volts A.C. is introduced across terminals 447 and 449 which are provided with a fuse 451, a switch 452 and a pilot light 453. Positive voltage is provided at the positive high voltage output 445 by a variable input autotransformer 456 and a 0 to 10 kv., 5 milliamp power pack 457. The resistor 458 is utilized to prevent damage to the power pack in the event one of the corona wires breaks or is shorted and thus prevents excessive loading. Also included in the circuit is a voltmeter 459 and a milliammeter 460, the latter being inserted in the circuit when required.

The negative high voltage is taken from output 465 and the circuit includes a variable autotransformer 466, a 0 to 10 kv., 5 milliamp power pack 467 with the resistor 468 performing the same function in this circuit as resistor 458 performed in the positive side of the circuit. There is also provided a voltmeter 469 and a milliammeter 470, the latter normally being shorted in the circuit. To place the ammeters in the circuit for reading current, switch 475 is moved from the closed position to the open position. Capacitors 476 and 477 are provided in the ammeter circuit to filter out transient voltages.

Figure 20:
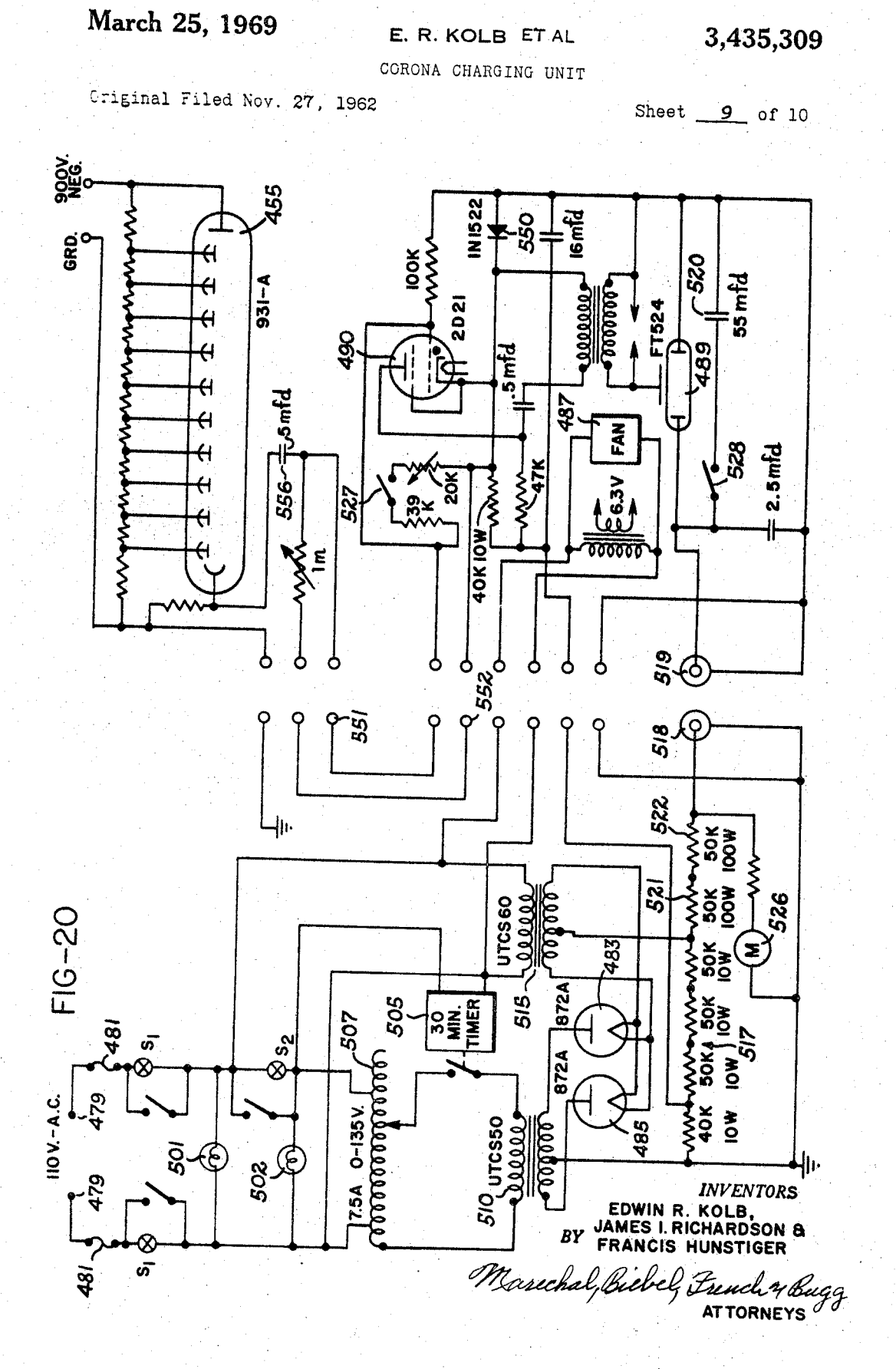

The circuit for the flash tube and the register control unit is shown in FIG. 20 wherein 110 volts A.C. are applied across terminals 479 which include two fuses 481. When the switches S$_1$ are closed, the filaments in the two full wave rectifiers 483 and 485 are energized, along with fan 487 which cools the flash tube 489. Heater voltage is applied to the trigger thyratron 490. Subsequent to closing switches S$_1$ and S$_2$, pilot lights 501 and 502 come on indicating that the circuit is in operating condition. Approximately thirty minutes after closing S$_2$, timer 505 closes allowing voltage to go to the plate of thyratron tube 490. By means of transformer or powerstat 507 and the step-up transformer 510, appropriate voltage is applied to the rectifiers 483 and 485. Transformer 515 supplies filament and power for tubes 483 and 485. The series of resistors generally designated 517 provides plate voltage for trigger thyratron 490. Pin connectors 518 and 519 are provided for bringing the high voltage into the flash tube circuit. Capacitor 520 is charged through the two charge limiting resistors 521 and 522, and the meter 526 is used to indicate the voltage on capacitor 520.

There are three modes of utilizing the flashing sequence of flash tube 489. In the first mode, switch 527 is closed and 528 is open such that thyratron tube 490 is biased as a relaxation oscillator to flash the flash tube at a frequency of about 20 to 30 cycles per second. This mode of operation may be utilized when aligning the images or focusing the lens system of the projection system.

In a second mode of operation, switch 527 is open and 528 is closed, the thyratron tube 490 is biased through the Zener diode 550, and the tube 490 is not flashed unless triggered. In this condition, the capacitor 520 is in the flash circuit and a microswitch placed between contacts 551 and 552 may be used for controlled flashing of the flash tube. This mode is particularly useful in instances where a single color operation is involved.

The third mode of operation is controlled by phototube 455 which transmits a positive pulse through capacitor 556 to the thyratron grid each time a dark spot is present on the web. In this mode of operation, the photocell registry pick-up system is being utilized to control the flash of the flash tube.

The electrical circuit for the toner control unit is shown in FIG. 21 in which 110 volts A.C. is introduced across leads 600 and 601, lead 601 including a fuse 602 with switches 603 connected in both lines. Also connected across the lines is a pilot light 604 which comes on as the circuit is energized. A transformer generally indicated 605 is connected to provide voltages for the filaments of the two tubes 606 and 607. Means in the form of a power supply 608, controlled by switch 609 are provided for maintaining the voltage on the light source for the photocell at a constant level in order to provide a constant level of illumination.

The circuit also includes relay contacts 610 for energizing the solenoid of control valve 237. Pilot lights 611 and 612 are utilized to indicate the position of the valve, the control signal for the solenoid appearing across output terminals 613. A 900 volt power supply 615 provides proper voltage for the measuring circuit 620 which includes phototube 625 operated at various dynode voltages controlled by the current through the resistors 626. The current through the resistors 626 is controlled by the voltage between the grid and cathode of the right hand portion 606a of tube 606, this voltage being a function of the current through the resistor 627. In this way, as the light on the photocathode increases, the current through resistor 627 increases, resulting in the grid of 606a tending to become more negative, and the current through 606a is reduced, reducing the dynode voltage. With this circuitry, logarithmic response to light is achieved. That is, the voltage at the anode 625a of the tube 625 is generally a logarithmic function of the light intensity on the cathode. The left hand portion 606b of tube 606 is a balance circuit used to zero out the microammeter 629. This meter, having a logarithmic scale, is used as a visual indication of the intensity of light transmitted through the transparent part of tube 235 (FIG. 13).

A second tube 607 includes a left hand portion 607a which is a cathode follower following the phototube plate 625a and in conjunction with 607b controlling a very sensitive center-stable relay 630. This relay's contacts 610, actuate solenoid 247 (FIG. 13) which allows valve 237 to add some concentrate to the stream going into the tube 235.

As described previously, the developer is being circulated constantly through the sensing unit and the photocell is continually monitoring the concentration thereof. Should the transmissability of the developer indicate that the toner concentration is low, the photocell causes the center-stable relay 630, as described above, to activate its contacts 610 which send an output signal to operate the solenoid 247.

The details of the dryer control circuit are shown in FIG. 22 wherein 110 volts A.C. input is across terminals 650 and 651 which include a switch 653 and a fuse 654. The circuit also includes a pilot light 655 indicating that the circuit is in operating condition. A diode rectifier 660 is utilized to provide D.C. voltage for the relay circuit generally indicated at 665. The relay contacts 665a and 665b are controlled by a sensitive relay 668 which is in a bridge circuit. Power for the bridge circuit 670 comes from a transformer 671, diode 672, a filtering capacitor 673 and a resistor 674.

A Zener diode regulator 675 is connected into the circuit so as to limit the voltage supplied to the bridge circuit 670. Associated with the bridge circuit is the potentiometer 684 which balances the bridge circuit and controls the level of transfer of the relay 668. As the temperature in the dryer drops below a predetermined minimum as sensed by the thermistor 680, the relay 668 is energized to transfer contacts 665 which in turn energizes relay 685 closing its contacts 685a and 685b to the dryer elements shown schematically at 689. A pilot light 690 is utilized to indicate that the dryer coils 689 are energized.

As can be understood from the above detailed description, an improved compact electrophotographic apparatus has been provided capable of producing repetitively in controlled sequence a multiplicity of images of the same pattern, or different images, as the case may be. It is also possible with the apparatus above described to produce multi-colored prints on a moving web by first forming a succession of images in a given color along the length of the web, and thereafter forming a second image in registry with the first. The second image may be of a color different from the first, or if desired, it may be of the same color. Following the sequence above described, enables the formation of prints in two or more colors as desired.

While the forms of apparatus herein described constitute preferred embodiments of the invention, it is to be understood that the invention is not limited to these precise forms of apparatus, and that changes may be made therein without departing from the scope of the invention.

What is claimed is:

1. An apparatus for imparting an electrostatic charge to a chargeable member, comprising a support member, a plurality of spaced electrically interconnected parallel wires carried by said support member, housing means for mounting said support member in spaced perpendicular relation to a path of travel of predetermined width, and each wire of said plurality of wires being shorter in length than the width of the path of travel.

2. An apparatus as set forth in claim 1 wherein said housing means supports a pair of spaced support members on opposite sides of a chargeable member, each said support member carrying a set of a plurality of electrically conductive wires in spaced parallel relation, means maintaining the wires of one set electrically insulated from the wires of the other set, each of said wires in each set being shorter in length than the width of the path of advancement, and each said wire of each set being arranged in a plane generally diagonal with respect to the path of web travel.

3. An apparatus as set forth in claim 1 further including a grounded conductive plate so disposed relative to said plurality of wires as to be on the side thereof opposite the path of advancement.

4. An apparatus as set forth in claim 2 wherein said support housing includes means forming an opening therein for advancement of a chargeable member between said sets of wires, and electrically conductive means positioned in spaced relation to said sets of wires on the side thereof opposite the path of advancement.

5. An apparatus as set forth in claim 4 wherein said electrically conductive means is a metallic backing plate so mounted in said housing that both sets of wires are disposed therebetween.

6. An apparatus as set forth in claim 2 wherein one set of wires is in direct opposed spaced facing relation to the wires of the other set.

7. An apparatus as set forth in claim 1 wherein a metallic backing plate is positioned between said support member and said plurality of fine wires.

8. An apparatus as set forth in claim 1 including means to apply between 8 to 20 microamps of current per inch to said wires.

9. An apparatus as set forth in claim 4 further including means to apply between 8 and 20 microamps of current per inch to said wires, the polarity of the voltage on one set of wires being opposite in sign to the other, and means to ground said electrically conductive means.

10. An apparatus as set forth in claim 5 further including means to connect the wires of said one and other set of wires to a source of corona generating potential of a first and second polarity respectively, and means to connect each said metallic plate to a reference potential intermediate that applied to said sets of wires.

References Cited

UNITED STATES PATENTS

| | | | |
|---|---|---|---|
| 2,879,395 | 3/1959 | Walkup | 250—49.5 |
| 2,922,883 | 1/1960 | Giaimo | 250—49.5 |
| 3,038,073 | 6/1962 | Johnson | 250—49.5 |
| 3,075,078 | 1/1963 | Olden | 250—49.5 |

JOHN F. COUCH, *Primary Examiner.*

W. M. SHOOP, JR., *Assistant Examiner.*

U.S. Cl. X.R.

250—49.5